United States Patent [19]
Glendinning

[11] Patent Number: 5,368,751
[45] Date of Patent: Nov. 29, 1994

[54] AUTOMATED FILTER PRESS

[75] Inventor: Peter H. Glendinning, Johannesburg, South Africa

[73] Assignee: Baker Hughes Incorporated, Houston, Tex.

[21] Appl. No.: 941,478

[22] Filed: Sep. 8, 1992

[30] Foreign Application Priority Data

Sep. 9, 1991 [ZA] South Africa .................. 91/7147

[51] Int. Cl.$^5$ .............................................. B01D 25/34
[52] U.S. Cl. ............................... 210/791; 100/198; 210/225; 210/230; 210/332
[58] Field of Search ................ 210/225, 227, 230, 791, 210/138, 141, 143, 770, 808, 232, 330, 332, 385, 388; 100/197, 198

[56] References Cited

U.S. PATENT DOCUMENTS

| | | | |
|---|---|---|---|
| 3,289,844 | 12/1966 | Emele | 210/225 |
| 3,366,243 | 1/1968 | Kurita | 210/225 |
| 4,491,519 | 1/1985 | Kurita | 210/228 |
| 4,710,293 | 12/1987 | Davis | 210/225 |
| 4,806,239 | 2/1989 | Davis | 210/225 |
| 4,900,454 | 2/1900 | Hedlund et al. | 210/770 |
| 5,006,241 | 4/1991 | Davis | 210/225 |
| 5,133,884 | 7/1992 | Carlsson et al. | 210/791 |
| 5,167,801 | 12/1992 | Kawasaki | 210/225 |

FOREIGN PATENT DOCUMENTS

| | | | |
|---|---|---|---|
| 2705694 | 8/1978 | Germany | 210/388 |

OTHER PUBLICATIONS

IR Industrial Process Machinery—published by Ingersoll-Rand Company—copyright 1980.
The MC Automatic Filter Press—published by Ingersoll-Rand Company—date unknown.
Lasta-G Filters—The Automatic Filter Press (Model ISDG)—published by Ishigaki Mechanical Indsutry Co., Ltd.—date unknown.
Kurita Automated Filter Press RF—published by Kurita Company—date unknown.
Larox ® CF Automatic Chamber Filter—published by Larox Inc.—date unknown.
Larox PF Automatic Pressure Filter—published by Larox Inc.—Bulletin 103 GB Nov. 1983.
EIMCO Shriver ™ Filter Presses—published by EIMCO Process Equipment Company—copyright 1986.
Shriver ™ Large Filter Presses—published by EIMCO Process Equipment Company—copyright 1989.

Primary Examiner—Joseph W. Drodge
Attorney, Agent, or Firm—Michael Polacek

[57] ABSTRACT

The present invention pertains to a filter press which includes a plurality of filter units arranged in tandem. Each unit has a filter plate and filter elements in the form of sheets at either side. Adjacent filter elements of adjacent units form pairs of elements. A working fluid containing liquid and solid components to be separated is charged at positions in between pairs of elements. The liquid filters through the elements into the plates to be exhausted. The solids build up in cakes intermediate the elements of the respective pairs. Each pair of elements is resiliently suspended from an eccentric rotor or shaft. When the cakes are to be dislodged, the press is opened, the units being parted. Rotation of the shaft cyclically slackens the filter elements and snaps them taut, thereby dislodging the cakes.

5 Claims, 4 Drawing Sheets

AUTOMATED FILTER PRESS

BACKGROUND OF THE INVENTION

This invention relates to a filter press and to a method of operating a filter press.

A filter press of the kind to which this invention relates and which is adapted to separate liquid and solid components of a feed stream comprises a plurality of filter units. Each filter unit comprises a filter plate and a pair of flexible filter elements in the form of filter cloths or filter fabrics respectively at opposite sides of the filter plate. The filter units are arranged in tandem, i.e. in parallel planes, in a frame intermediate a fixed support and a displaceable end plate. The displaceable end plate is operatively connected to displacement means—generally in the form of a hydraulic ram—selectively to close the filter units against one another (the closed condition of the filter press) and to part the various filter units from another (the open condition of the filter press). In its closed condition, the pressure to which the filter units are subjected on account of the ram seals the filter units off against one another.

Each filter plate has, along its opposed sides, depressions. Its filter elements are spanned over those depressions. In use, when under pressure, the filter elements will be pressed against, to be supported by, the bottoms of those depressions.

Conduits are provided respectively to charge the filter press, more specifically to introduce the feed stream in the form of a slurry or suspension or the like under pressure into envelopes formed intermediate the pairs of adjacent filter elements. The liquid component flows under pressure through the filter elements into the depressions, i.e. intermediate the respective filter plates and their filter elements, and passages are provided to exhaust such liquid. The solids component of the feed stream builds up ultimately to form a cake intermediate each pair of filter elements. At that stage, charging of the filter press is interrupted, and the displacement means is operated to part the plates and the cakes are removed.

If desired, the press can be washed or rinsed, generally by providing sprayers spraying a liquid—normally water—onto the upstream faces of the filter elements.

The displacement means is operated again and the filter units are moved against each other and compressed against one another intermediate the fixed end support and the movable end plate.

SUMMARY OF THE INVENTION

In accordance with the invention, there is provided a method of operating a filter press of the kind described and which comprises a plurality of filter units each comprising a filter plate and a pair of flexible filter elements respectively at opposite sides of the filter plate, the filter units being arranged in tandem such that, intermediate adjacent filter plates, pairs of filter elements of the respective filter units extend alongside each other, the method including introducing a feed stream, having liquid and solid components which are to be separated, into the filter press at positions intermediate adjacent filter units and intermediate said pairs of filter elements extending alongside each other; causing the liquid component to filter through the respective filter elements, and exhausting the liquid via the respective filter plates; allowing the solid component to build up in the form of cakes intermediate said pairs of filter elements extending alongside each other; and opening the press and mechanically flexing and straightening the filter elements thereby mechanically to dislodge the cakes from the filter elements.

Said flexing and straightening of the filter elements may be effected repeatedly or cyclically for a predetermined number of times or period of time.

Preferably, when each filter element is attached at a lower edge of its filter plate, at least an upper portion of the filter element being left unattached from its filter plate, the method may include suspending each filter element via an upper edge thereof and raising said upper edge to span the filter element over its filter plate when closing the press or prior to closing the press. Said mechanically flexing and straightening the filter elements may then be effected respectively by slackening each filter element by lowering said upper edge, and snapping each filter element by raising said upper edge. Furthermore, said mechanically flexing and straightening the filter elements may be achieved by reciprocating said upper edge of each filter element. Reciprocating may be effected by suspending the filter elements from an eccentrically supported rotor and rotating said rotor.

The invention extends to a filter press of the kind described and which comprises a plurality of filter units, each filter unit comprising a filter plate and a pair of flexible filter elements respectively at opposite sides of the filter plate, the filter units being arranged in tandem such that, intermediate adjacent filter plates, pairs of filter elements of the respective filter units extend alongside each other, and in displaceable fashion such that the filter press can be opened to part the filter elements of each pair; charging means for charging a feed stream, having liquid and solid components which are to be separated, into the filter press at positions intermediate adjacent filter units and intermediate said pairs of filter elements extending alongside each other, the liquid component being caused in use to filter through the respective filter elements and subsequently to be exhausted from the respective filter plates by means of exhausting means, the solid component being caused to build up in the form of cakes intermediate the pairs of filter elements, the filter press further including mechanical flexing and straightening means for mechanically flexing and straightening the filter elements when the press is open to dislodge the cakes from the respective filter elements.

Each filter plate may include attachment means for attaching each filter element along a lower edge thereof, at least an upper portion of the filter element being left unattached from its filter plate, and suspending means for suspending each filter element along an upper edge thereof, the mechanical flexing and straightening means being adapted, sequentially, to lower and raise said upper edge of each filter element. The mechanical flexing and straightening means may be adapted repeatedly or cyclically to flex and straighten each filter element. The mechanical flexing and straightening means may be in the form of reciprocating means. The reciprocating means may include an eccentrically supported rotor and rotating means for selectively rotating the rotor, the suspending means suspending the filter elements from said rotor.

The suspending means may include, for each pair of adjacent filter elements, clamping means arranged to clamp over the upper edge portions of the filter elements, which edge portions will be arranged against each other prior to clamping, a collar arranged over the rotor to allow relative rotation, and connecting means operatively interconnecting the clamping means and the collar. The connecting means may be resilient.

DETAILED DESCRIPTION OF THE INVENTION

Figure 1:
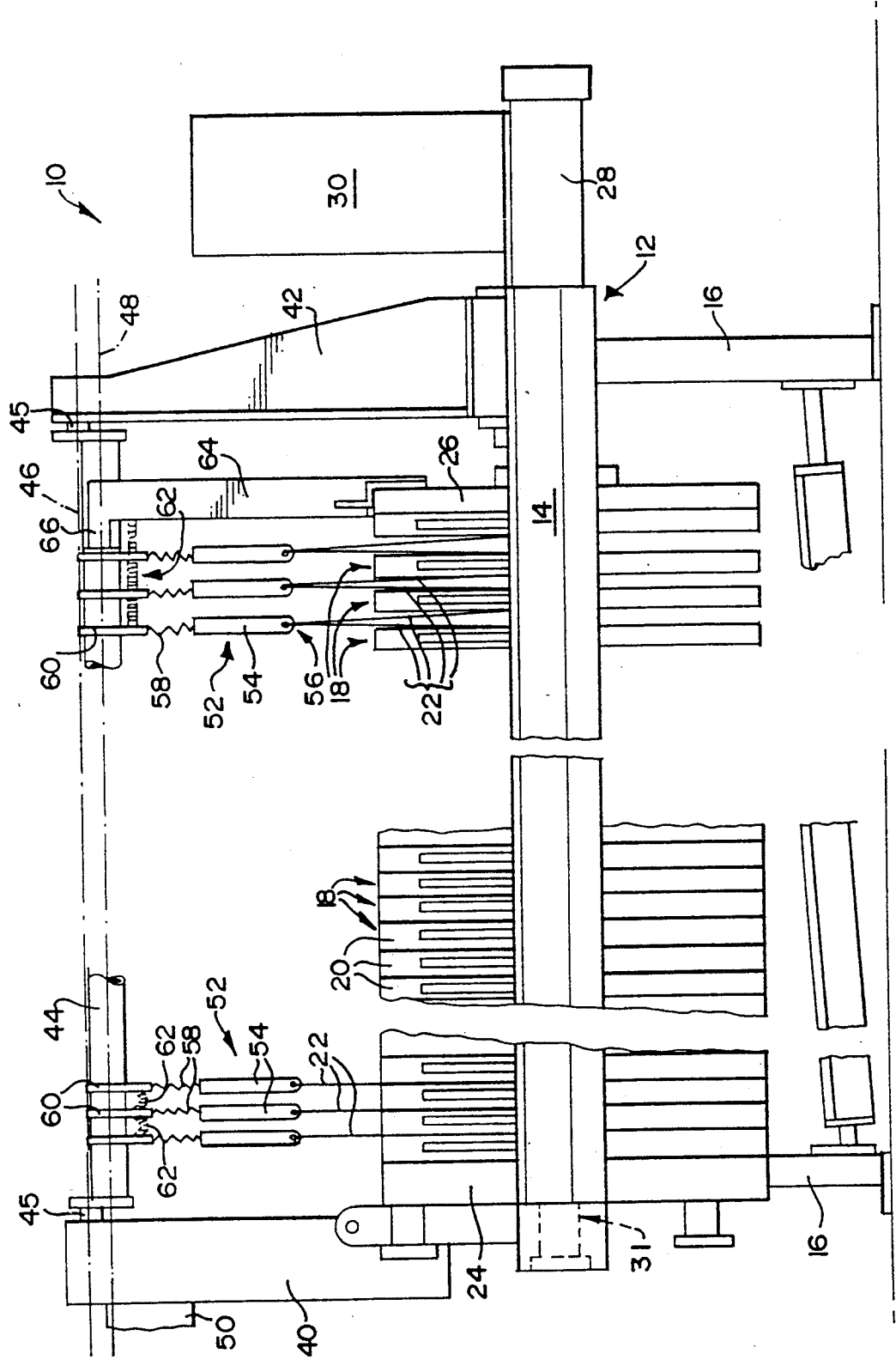
FIG. 1 shows, in side view, a filter press in accordance with the invention.

With reference to FIG. 1 of the drawings, a filter press in accordance with the invention is generally indicated by reference numeral 10.

The filter press comprises a frame generally indicated by reference numeral 12 and comprising a pair of side bars 14 which extend longitudinally, respectively longitudinally along opposed sides, of the filter press 10. The side bars 14 are elevated on legs 16.

A plurality of filter units 18 are slidably supported intermediate the side bars 14. Each filter unit comprises a filter plate 20 and, at opposed sides of the plate 20, a filter element 22 in the form of a filter cloth or filter fabric.

At one end of the frame 12, there is provided a fixed support plate 24 against which the filter units 18 are checked in use.

Opposite to the fixed support plate 24, there is provided a displaceable end plate 26 mounted at one end of a hydraulic ram 28. A motor and pump unit and control for the hydraulic ram 28 are diagrammatically shown at 30.

In use, the hydraulic ram 28 is extended to displace the displaceable end plate 26 toward the fixed support plate 24. The displaceable end plate 26 abuts the filter unit 18 adjacent thereto to displace it toward the support plate 24. The filter unit 18, in turn, abuts and displaces its adjacent filter unit and so on. At the end of the stroke of the hydraulic ram 28, all of the filter units 18 are compressed against each other intermediate the fixed support 24 and the displaceable end plate 26.

It is to be appreciated that, intermediate each pair of adjacent filter plates 20, a pair of filter elements 22 is provided. Each filter plate 20 has a depression into each side. The filter elements are spanned over the respective depressions and, when under pressure, line the respective depressions.

A charging conduit 31 is provided at one end of the frame 12 which charging conduit is in communication with a plurality of aligned charging passages. Each charging passage is provided by means of a passage through each filter plate and collars in communication with each filter plate passage and stitched into each filter element.

When the filter press 10 is in its closed condition as described above and as shown in FIG. 1 adjacent the fixed support 24, a working fluid comprising liquid and solids components which are to be separated is charged via the charging conduit 31 and the passages in the filter units 18 to inject, under pressure, the working fluid into envelopes intermediate the respective pairs of filter elements. The liquid component flows under pressure through the filter elements and is exhausted via exhaust passages provided for that purpose in the filter plates. The solids component builds up in the form of cakes intermediate the pairs of filter elements. The cakes are formed, molding fashion, between the depressed sides of adjacent filter plates, the filter elements lining the respective depressions.

When the cakes have been formed, charging of the filter press is interrupted and the hydraulic ram 28 is retracted to displace the displaceable end plate 26 away from the fixed support plate 24 and thus to render the various filter units 18 spaced from each other as shown adjacent the displaceable end plate 26 in FIG. 1. Displacement of the various filter units will be described in more detail with reference to FIG. 2.

When the filter press is thus in its open condition, the filter cakes can be removed. This is effected in terms of the method of this invention as will be described hereinafter.

Figure 2:
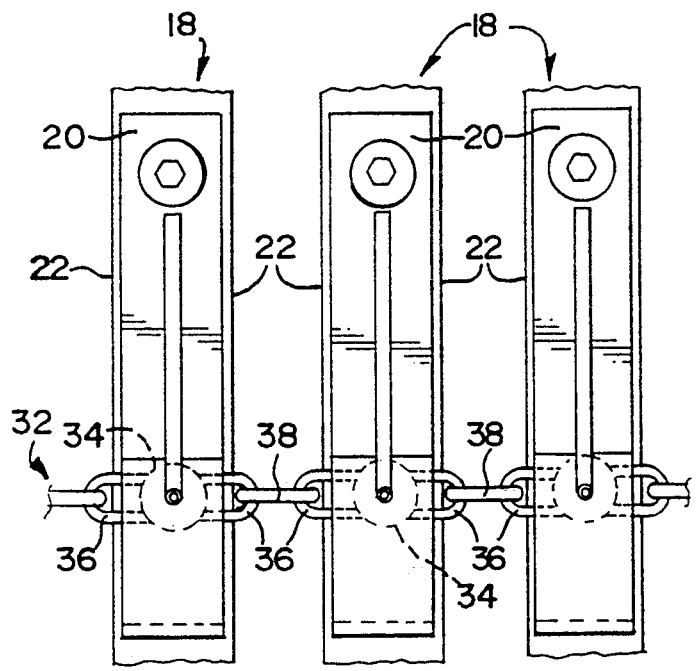
FIG. 2 shows, in side view, to a larger scale, in relation to a few filter units, a towing chain of the filter press of FIG. 1.

A towing chain 32 for the filter units 18 is now described with reference to FIG. 2. Each filter unit 18 has, located relatively to its filter plate 20, a short transverse cylinder 34. Links 36 are fixed diametrically oppositely to the cylinder 34. Links 38 are located with lost motion intermediate adjacent fixed links 36 i.e. intermediate the respective filter units 18. When the filter press is closed i.e. the filter units 18 are moved against each other, the links 38 allow this by becoming slack. When the filter press 10 is opened when the ram 28 and the displaceable end plate 26 are retracted, the link portions become progressively taut in between adjacent filter units thus towing the filter units successively into their open positions.

With reference again to FIG. 1, in accordance with the invention, each filter element 22 is fixed to its filter plate 20 only along a lower edge thereof, i.e. side edges and upper edges of the filter units are free from the filter plates 20. The upper edges extend upwardly beyond the upper edges of the filter plates 20. The upper edges of adjacent filter elements i.e. filter elements from adjacent units 18, are paired and are clamped together as shown at 56 to suspension means 52.

The suspension means 52 comprises, for each pair of filter elements, a hanger 54 by means of which the upper edges of the filter elements are clamped.

Further in accordance with the invention, reciprocating means in the form of an eccentrically supported shaft 44 is provided. The shaft 44 is supported on posts respectively indicated at 40 and 42 and respectively at opposed ends of the frame 12. Cranked journals 45 are provided at either end of the eccentric shaft 44. The journals 45 are received in bearings, bushes, or the like in the respective posts 40, 42. The journals 45 provide a rotation axis 46 and the axis 48 of the shaft 44 is eccentric to the rotation axis 46 a predetermined amount. Rotation means for the shaft 44 in the form of a motor and gearbox combination is provided in association with the post as shown diagrammatically by reference numeral 50.

For each hanger 54, there is provided a collar 60 rotationally supported in a bush on the eccentric shaft 44. Connecting means, which, in this embodiment, is resilient in the form of a coil spring and indicated by reference numeral 58, is provided to connect each hanger 54 to its collar 60. In other embodiments, the connecting means may be resistant to stretching in the sense as not being resilient, but they may nevertheless be flexible, i.e. in the form of cables or the like.

The collars 60 are, in use when the filter units 18 are closed or opened, displaced in sympathy. Thus, there is provided an upwardly extending arm 64 mounted on the displaceable end plate 26. The arm 64 has an abutment formation 66, which may be in the form of a bifurcation, arranged to abut the collar 60 adjacent thereto. Abutment means, not shown, are provided intermediate the respective collars. The length of the abutment means is selected such that the pitch of the collars 60, when abutting, is equal to the pitch of the filter units 18 when abutting. The arrangement is such that each collar 60 is directly above the interface between the two filter units 18 served by it. Thus, when the hydraulic ram 28 is extended to close the filter units 18, the collars 60 are displaced in sympathy.

Between each pair of collars 60, there is provided a towing chain 62 which operates in similar fashion to the towing chain 32 described with reference to FIG. 2. Thus, when the hydraulic ram 28 is retracted to open the filter press 10, the arm 64 is retracted simultaneously and the towing chains 62 come in operation progressively to tow the respective collars 60 to positions corresponding to the open positions of the respective filter units.

Conveniently, the rotating means of the eccentric shaft 44 will be adapted to stop rotation with the eccentric shaft in its uppermost condition i.e. in a condition diametrically opposed to the condition shown in FIG. 1. In that condition, the respective filter elements 22 will be relatively taut and the filter press will in use be closed with the filter elements 22 in that condition.

In accordance with the invention, when the filter press 10 is opened to remove the cakes, the rotating means is brought into operation to rotate the eccentric shaft. When the eccentric shaft 44 moves into its lower condition, the filter elements 22, under gravity, as well as the suspension means 52 are lowered thus to slacken and flex the filter elements 22. As the eccentric shaft 44 moves through its lowermost position and toward its uppermost condition, the filter elements 18 are straightened. This is effected cyclically. In this fashion the filter elements are first slackened and then snapped taut to dislodge the cakes and to allow the cakes to fall under gravity out of the filter press 10.

It is envisaged that, after a predetermined period, rotation of the eccentric shaft 44 will stop with the eccentric shaft 44 in its uppermost condition. While the filter units 18 are spaced i.e. the filter press is in its open condition, a supervisor can visually, in a few seconds, establish that all of the cakes have been dislodged. Should a cake not have been dislodged, it can be dislodged manually. It is important to ensure, with high integrity, that all of the cakes have been dislodged prior to continuing operation of the filter press.

When all the cakes have thus been dislodged, the hydraulic ram 28 can be extended to close the press and the charging of working fluid into the press to commence another batch can start.

If desired, prior to closing the press i.e. when the filter units are still spaced, the filter elements can be washed by means of spraying.

Figure 3:
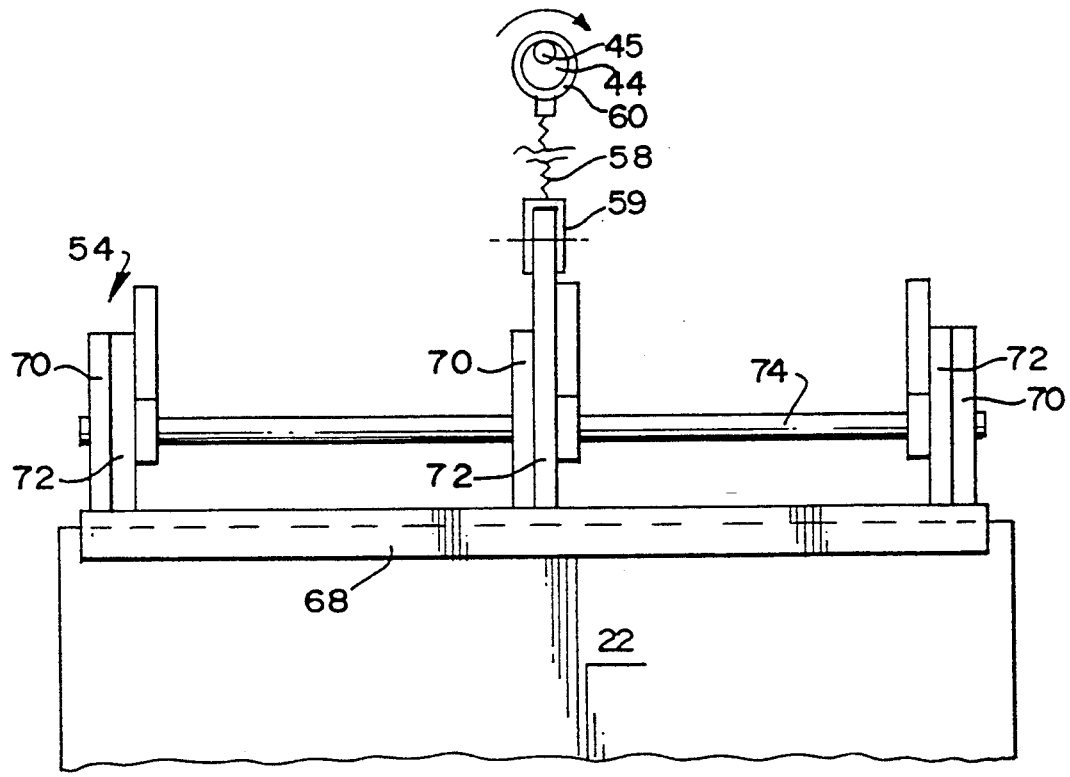
FIG. 3 shows, to a larger scale, in fragmentary end view, suspension of filter elements of the filter press of FIG. 1.

Clamping of the paired filter elements as shown at 56 in FIG. 1 is now described in more detail with reference to FIGS. 3, 4 and 5.

Each hanger 54 comprises a pair of transversely extending cross members 68 corresponding to the width of the filter elements 22. At ends of the cross members 68, and intermediate those ends, pairs of limbs 70, 72 are provided pivoted to each other via a transverse pivot pin 74 and connecting the respective limbs 70, 72. Clips, alternative embodiments of which are shown respectively in FIGS. 4 and 5, are provided to force the limbs 70, 72 together to perform a clamping action. Thus, when paired, the filter elements are interposed intermediate the cross members 68, and the clips are applied to clamp the filter elements together and to the hanger 54.

Figure 4:
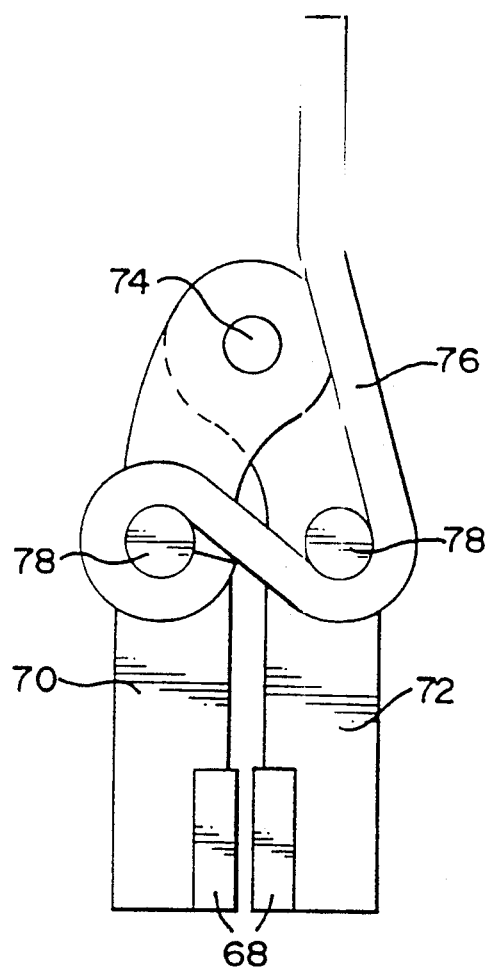
FIGS. 4 and 5 show different embodiments, in side view, to an even larger scale, of clips of the suspension means of FIG. 3.

In one embodiment, a resilient or spring clip 76 shown in FIG. 4 is used for this purpose. Stubs 78 are provided on the respective limbs 70, 72, for engagement by the spring clip 76 as shown.

Figure 5:
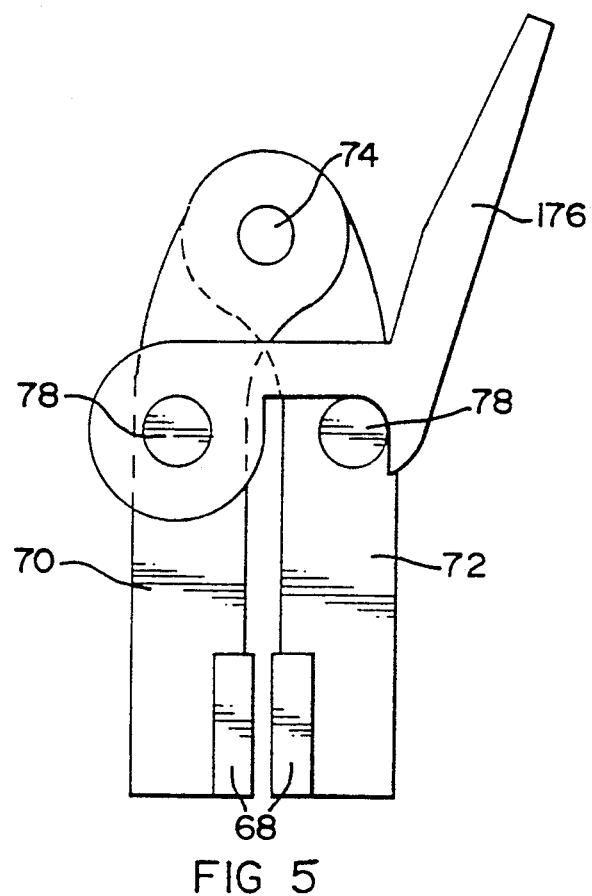

In FIG. 5, a rigid clip 176 is shown as an alternative to the spring clip 76.

Figure 6:
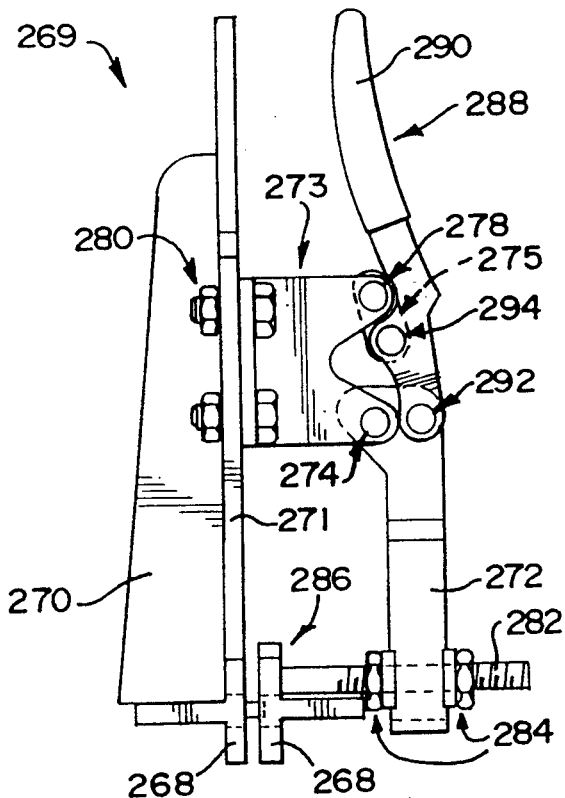
FIGS. 6 and 7 show, in side views, yet a further embodiment of a clip or clamp of the suspension means of FIG. 3, respectively in closed and open conditions.
Figure 7:
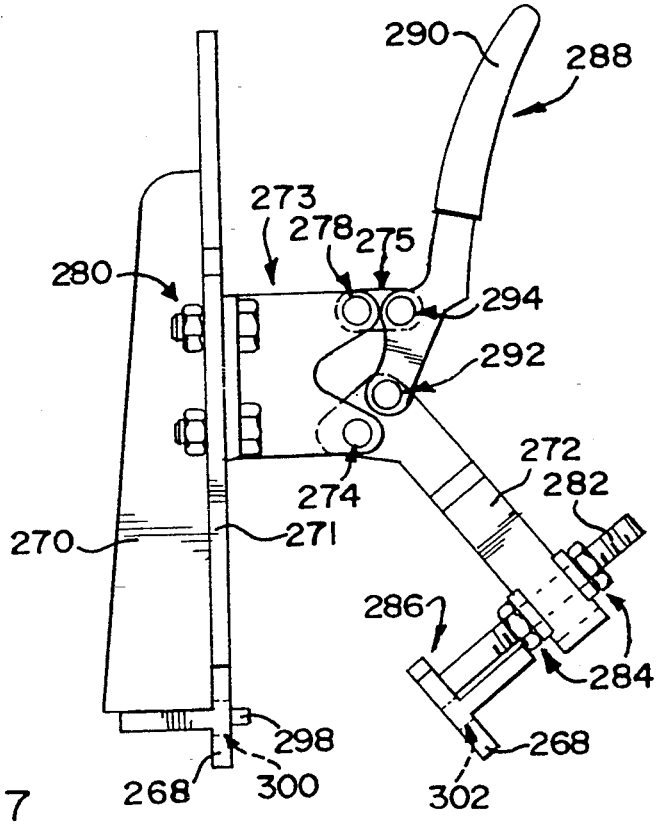

With reference to FIGS. 6 and 7, a preferred clamp arrangement, generally indicated by reference numeral 269, is proposed instead of the arrangements of FIGS. 4 and 5. In FIG. 6, the clamp 269 is shown in closed condition in which it clamps filter elements 22 in use between cross members 268 or inserted in between the cross members 268.

A first cross member 268 is integral with an erect limb in the form of a flange 271 which is reinforced by means of a rib or web 270.

Spaced above the cross member 268, a pedestal 273 is bolted to the flange 271 generally as indicated by reference numeral 280.

A second limb 272 of the clamping arrangement 269 is, at one end thereof, pivoted as indicated by reference numeral 274 to the pedestal 273. As an opposed end of the limb 272, it carries a second cross member 268. In this embodiment, said second cross member 268 is mounted on the limb 272 by means of a stud 282 which is located by means of locating nuts 284 on the limb 272. The locating nuts 284 allow the spacing between the limb 272 and the second cross member 268 to be adjusted. The second cross member 268 is conveniently welded at 268 to one end of the stud 282.

The clamping arrangement 269 comprises a clamping lever 288 having a handle 290 at a free end thereof. At an opposed end, it is pivoted as indicated by reference numeral 292 to that end of the limb 272 which is pivoted at 274. The two pivot points 274 and 292 are adjacent each other.

The clamping lever 288 is pivotally connected by means of a link 275 to the pedestal 273 at a position spaced above the pivot joint 274. Pivoting of the link 275 to the pedestal 273 and the lever 288 is effected respectively as indicated at 278 and 294.

With reference more specifically to FIG. 7, when the handle 290 is urged outwardly as indicated by reference numeral 296, it is pivoted about the pivot points 292 and 294. To enable such pivoting to take place, the link 275 changes its orientation thus forcing the pivot point 292 upwardly to cause the limb 272 to pivot about the pivot point 274 thus displacing the cross member 268 fixed to the second limb 272 away from the cross member 268 fixed to the first limb. In this manner, a pair of filter elements 22 can be released from and can be reclamped by means of the clamping arrangement 269.

By way of development, and as can best be seen from FIG. 7, the first cross member 268 integral with the flange 271 has a projection 298 transverse to its clamping face. It is surrounded by an aperture 300 thus forming an annular opening around the projection 298. On the second, opposed cross member 268, and aligned with the projection 298 and its annular opening 300, there is provided a complemental opening 302. The projection 298 is thus receivable with clearance within the opening 302. This arrangement enhances the effectiveness of clamping of the filter elements 22.

With reference again to FIGS. 1 and 3, the connecting means 58 is connected via a stirrup 59 to the center of each hanger 54.

Conveniently, each filter element is attached to its filter plate along a lower edge of the filter plate by means of clips, engagement pegs or any other convenient means which does not require tools to be operated. Furthermore, it is of importance to appreciate that charging via the charging conduit 31 takes place at a low level. Thus, the charging passages through the plates and the aligned charging collars through the filter elements are provided as close as conveniently possible to the lower edge of the plates. By stitching the collars onto the elements, high integrity of attachment is obtained which is important to withstand the shaking or slackening and snapping taut action. In this regard, it is to be appreciated that attachment of the filter elements along the lower edges of the filter plates must be such as to ensure alignment of the charging conduits and collars.

The Inventor has appreciated that whether or not a cake will be dislodged from its cloth is virtually independent from the spacing between filter units in the open condition of the press. Thus, the Inventor is opinion that it does not facilitate or does not meaningfully facilitate dislodging of the cakes to separate the filter units by much more than the thickness of the cake plus a nominal clearance. Reliance upon this discovery by the Inventor allows all of the filter units to be spaced from each other simultaneously when the press is its open condition, and without having the frame unduly long. This thus allows all of the filter elements to be shaken or slackened and snapped taut simultaneously which simplifies the design and construction of the reciprocating and suspension means and also shortens the time required to unload the filter press.

An increasing need has been determined by the marketplace for the use of filter presses to enable dewatering of slurries such that they have lower moisture contents than what can be achieved by other conventional separating means. It has been a significant problem in satisfying this need that the filter press is by nature batch operated. The control of such batch operation is critically dependent upon the ability to remove the cakes, which form between the plates, without human intervention. It thus has significant advantages that, first, all of the cakes can be dislodged simultaneously, secondly that all of the filter units can remain spaced during and after such dislodging to allow easy inspection and thirdly that relatively little displacement is sufficient to allow the invention to be performed. The relatively small displacement enhances simplicity of operation, compactness of the filter press as well as safety of operation.

In the forgoing specification, this invention has been described with reference to specific exemplary embodiments thereof. It will be apparent, however, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method of operating a filter press, said filter press comprising a plurality of filter units, each said filter unit comprising a filter plate having opposite sides and including a lower edge and a pair of flexible filter elements extending respectively along the opposite sides of the filter plate, each of said filter elements including an upper edge and an upper portion, the filter units being arranged in tandem such that, intermediate adjacent filter plates, pairs of filter elements of the respective filter units extend alongside each other, said method comprising the steps of introducing a feed stream including a liquid component and a solids component which are to be separated into the filter press at positions intermediate adjacent filter units and intermediate said pairs of filter elements extending alongside each other, causing the liquid component to filter through the respective filter elements and exhausting the liquid via the respective filter plates, allowing the solids component to build up in the form of cakes intermediate said pairs of filter elements extending alongside each other, opening the press, and flexing and subsequently straightening substantially each entire filter element thereby dislodging the cakes from the filter elements, wherein each filter element is attached at the lower edge of the filter plate and at least the upper portion of the filter element is left unattached from the filter plate, the method further including suspending each filter element via the upper edge thereof and raising said upper edge to span the filter element over the filter plate when closing the press or prior to closing the press whereby the flexing and straightening of the filter elements is effected respectively by slackening each filter element by lowering its upper edge, and then snapping each filter element by raising its upper edge, all by reciprocating said upper edge of each filter element by suspending the filter elements from an eccentrically supported rotor and rotating said rotor.

2. A method of operating a filter press according to claim 1 wherein the flexing and straightening of the filter elements is effected repeatedly or cyclically for a predetermined number of times or period of time.

3. A filter press comprising a plurality of adjacent filter units, each said filter unit comprising a filter plate having opposite sides and including a lower edge and a pair of flexible filter elements extending respectively along the opposite sides of the filter plate, each filter element including an upper edge and an upper portion, the filter units being arranged in tandem such that the filter plates are adjacent and pairs of filter elements of the respective filter units extend alongside each other in a displaceable fashion such that the filter press can be opened to art the filter elements of each pair, and charging means for charging a feed stream, said stream having liquid and solid components which are to be separated, into the filter press at positions intermediate adjacent filter units and intermediate said pairs of filter elements extending alongside each other, the liquid component being caused in use to filter through the respective filter elements and subsequently to be exhausted from the respective filter plates be exhausting means, the solid component being caused to build up in the form of cakes intermediate the pairs of filter elements, the filter press further including flexing and straightening means for flexing and straightening substantially the entirety of each said filter element when the press is open to dislodge the cakes from the respective filter elements wherein each filter plate includes attachment means for attaching each of said filter elements along the lower edges thereof, at least the upper portion of the filter elements being left unattached from the filter plate, and suspending means for suspending each filter element along the upper edge thereof, the flexing and straightening means being in the form of reciprocating means including an eccentrically supported rotor and rotating means for selectively rotating the rotor, the suspending means suspending the filter elements from said rotor in order to, sequentially, lower and raise said upper edge of each filter element.

4. A filter press according to claim 3 wherein the suspending means includes, for each pair of filter elements, clamping means arranged to clamp over the upper edge of the filter elements, a collar arranged over the rotor to allow relative rotation, and connecting means operatively interconnecting the clamping means and the collar.

5. A filter press according to claim 4 wherein the connecting means is resilient.

* * * * *

UNITED STATES PATENT AND TRADEMARK OFFICE
CERTIFICATE OF CORRECTION

PATENT NO. : 5,368,751

DATED : November 29, 1994

INVENTOR(S) : Peter H. Glendinning

It is certified that error appears in the above-identified patent and that said Letters Patent is hereby corrected as shown below:

In Column 8, line 59, change "art" to --part--;

Signed and Sealed this

Fourth Day of July, 1995

BRUCE LEHMAN

Attest:

Attesting Officer

Commissioner of Patents and Trademarks